United States Patent [19]

Simonutti

[11] Patent Number: 5,932,661
[45] Date of Patent: Aug. 3, 1999

[54] GOLF BALL CORE WITH TITANATE COUPLING AGENT

[75] Inventor: Frank M. Simonutti, Jackson, Tenn.

[73] Assignee: Wilson Sporting Goods Co., Chicago, Ill.

[21] Appl. No.: 08/723,608

[22] Filed: Oct. 2, 1996

[51] Int. Cl.$^6$ .................................................. A63B 37/06
[52] U.S. Cl. .................... 525/274; 473/371; 473/372; 473/377; 473/359
[58] Field of Search ...................................... 473/371, 372, 473/377, 359; 525/274

[56] References Cited

U.S. PATENT DOCUMENTS

| | | | |
|---|---|---|---|
| 3,992,014 | 11/1976 | Retford | 525/105 |
| 4,076,255 | 2/1978 | Moore | 526/29 |
| 4,848,770 | 7/1989 | Shama . | |
| 5,037,104 | 8/1991 | Watanabe | 524/908 |
| 5,131,662 | 7/1992 | Pollitt | 524/430 |
| 5,255,922 | 10/1993 | Proudfit | 525/193 |
| 5,314,187 | 5/1994 | Proudfit | 525/193 |
| 5,779,561 | 7/1998 | Sullivan | 473/373 |

FOREIGN PATENT DOCUMENTS

| | | |
|---|---|---|
| 1265596 | 3/1972 | United Kingdom . |
| 2 206 889 | 1/1989 | United Kingdom . |
| 2302657 | 1/1997 | United Kingdom . |

OTHER PUBLICATIONS

Ken–React Reference Manual (Kenrich Petrochemicals) pp. 1–3,22; 1985.

*Primary Examiner*—David Buttner

[57] ABSTRACT

A golf ball has a core which includes a titanate coupling agent. The core comprises rubber and about 0.2 to 5.0 phr of titanate coupling agent. The titanate coupling agent may be selected from the class consisting of monoalkoxy titanates and neoalkoxy titanates.

15 Claims, 2 Drawing Sheets

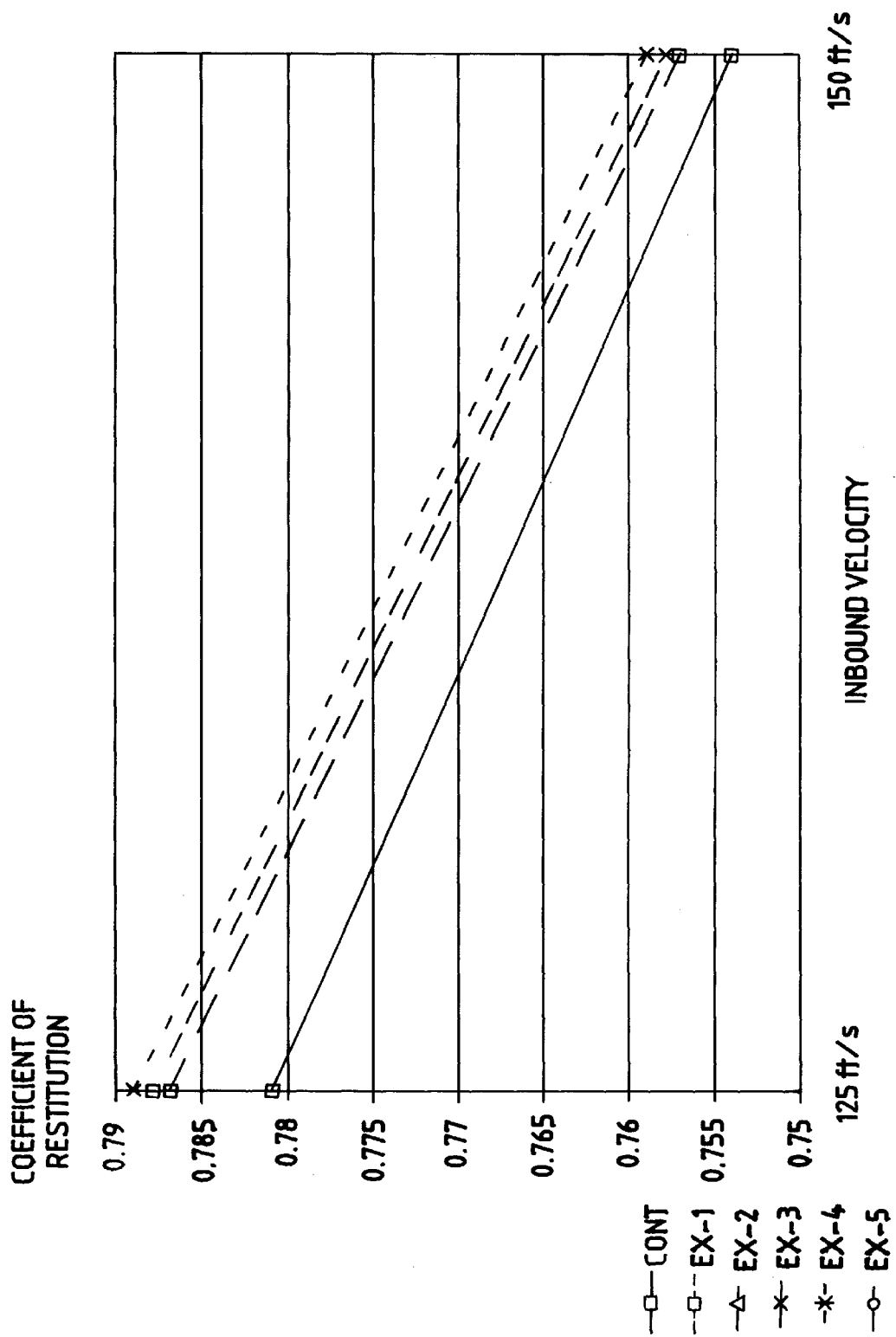

GOLF BALL CORE WITH TITANATE COUPLING AGENT

BACKGROUND

This invention relates to golf balls, and, more particularly, to a golf ball core which includes a titanate coupling.

Golf balls generally fall into three categories:
1. solid golf balls, which include a core and no cover;
2. two-piece golf balls, which include a core and a cover; and
3. three-piece golf balls, which include a core, a layer of windings of elastic thread, and a cover. The core may include a liquid center and a solid outer layer or mantle which surrounds the center.

Golf ball covers consist primarily of cut-resistant covers and covers which are made from natural or synthetic balata. Cut-resistant covers generally include one or more ionic copolymers or ionomers. Popular ionomers for golf ball covers are available from E.I. DuPont de Nemours & Co. under the trademark Surlyn and from Exxon Corp. under the trademark Iotek.

Golf ball cores generally include natural or synthetic rubber, active ingredients, and inert fillers. The rubber is conventionally polybutadiene. The active ingredients may include a crosslinking agent, a polymerization initiator, and an antioxidant. In a conventional core there is no physical bond between the inert fillers.

SUMMARY OF THE INVENTION

The invention utilizes a titanate coupling agent to create a bond between the organic and inorganic phases of the rubber compound. The coupling agent creates a more efficient cured compound, which exhibits higher initial velocity and coefficient of restitution, as well as slightly higher compression and impact durability.

DESCRIPTION OF THE DRAWING

The invention will be explained in conjunction with an illustrative embodiments shown in the accompanying drawing, in which

FIG. 4 compares coefficient of restitution of cores with and without titanate coupling agents.

DESCRIPTION OF SPECIFIC EMBODIMENTS

Figure 1:
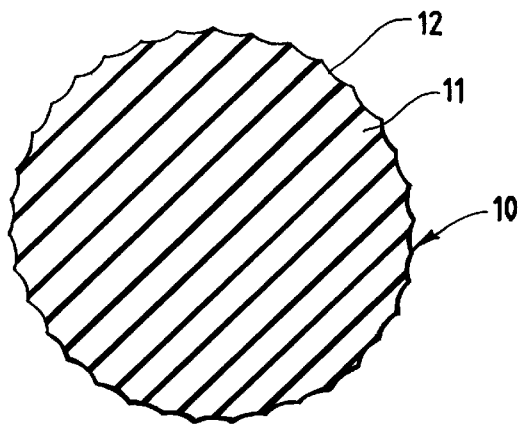
FIG. 1 is a cross sectional illustration of a solid golf ball formed in accordance with the invention.

FIG. 1 illustrates a solid golf ball 10 having a relatively uniform and homogenous core 11. The outside surface of the core is provided with conventional dimples 12.

Figure 2:
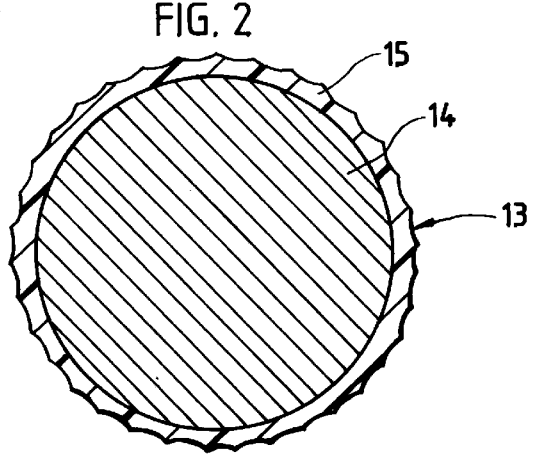
FIG. 2 is a cross sectional view of a two-piece golf ball formed in accordance with the invention.

FIG. 2 illustrates a two-piece golf ball 13 having a solid core 14 and a cover 15.

Figure 3:
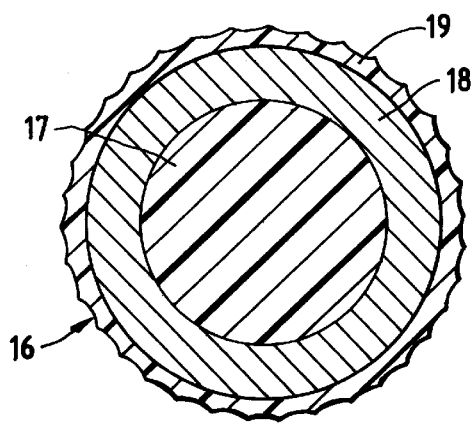
FIG. 3 is a cross sectional view of a three-piece golf ball formed in accordance with the invention.

FIG. 3 illustrates a three-piece golf ball 16 having a solid core 17, a layer of elastic windings 18, and a cover 19.

The covers 15 and 19 can be formed from natural or synthetic balata, ionomers or other conventional polymers. The cover can be injection molded over the core or windings or can be formed from two hemispherical half shells which are compression molded over the core or windings.

The cores 11, 14, and 17 are formed from a compound comprising:

1. 100 parts by weight of rubber;
2. about 10 to 50 phr (parts by weight per hundred parts by weight of rubber) of a crosslinking agent;
3. about 0.2 to 5.0 phr of a crosslinking initiator;
4. miscellaneous fillers/activators/antioxidants; and
5. about 0.1 to 2.0 phr of a titanate coupling agent.

The rubber is preferably polybutadiene, more preferably polybutadiene having a cis-1,4 content of at least 97%.

The crosslinking agent is preferably an acrylate of a zinc salt, for example, zinc diacrylate.

The crosslinking initiator is preferably organic pexoide, more preferably dicumyl peroxide.

The fillers, activators, and antioxidants, and the amounts thereof, can be those which are conventionally used in golf ball cores, for example, zinc oxide and barytes.

The titanate coupling agents are preferably selected from the class consisting of monoalkoxy and neoalkoxy titanates. Suitable coupling agents include:

Monoalkoxy Titanates—isopropyl triisostearoyl titanate, isopropyl dimethacryl isiostearoyl titanate, isopropyl tri(dodecyl)benzenesulfonyl titanate, etc.

Neoalkoxy Titanates—neopentyl(diallyl)oxy, trineodecanoyl titanate, neopentyl(diallyl)oxy, tri(dodecyl) benzene-sulfonyl titanate, neopentyl(diallyl)oxy, tri(dioctyl)phosphato titanate, etc.

Table 1 lists the formulas for one control core without a titanate coupling agent and five cores with a titanate coupling agent identified as EX-1 through EX-5.

Cores EX1 through EX-3 include a monoalkoxy titanate coupling agent (KR TTS). Cores EX-4 and EX-5 include a neoalkoxy titanate coupling agent (LICA L12/E).

TABLE 1

Titanate Core Blends

| Material | Cont | EX-1 | EX-2 | EX-3 | EX-4 | EX-5 |
|---|---|---|---|---|---|---|
| BR 1207 | 100 | 100 | 100 | 100 | 100 | 100 |
| SR 416D | 32 | 32 | 32 | 32 | 32 | 32 |
| Zinc Oxide | 5 | 5 | 5 | 5 | 5 | 5 |
| Barytes | 16.2 | 16.2 | 16.2 | 16.2 | 1.6.2 | 16.2 |
| Dicup 40C | 3 | 3 | 3 | 3 | 3 | 3 |
| Wingstay L-HLS | 0.2 | 0.2 | 0.2 | 0.2 | 0.2 | 0.2 |
| KR TTS | — | 0.1 | 0.25 | 0.4 | — | — |
| LICA L12/E | — | — | — | — | 1.25 | 5 |

BR 1207 - Goodyear Polybutadiene (97% cis-content)
SR 416D - Sartomer Zinc Diacrylate
DiCup 40C - Herculus DiCumyl Peroxide - 40% active peroxide content
Wingstay L-HLS - Goodyear Antioxidant
KR TTS - Ken React Titanate Coupling Agent. (Isopropyl tri-isostearoyl titanate)
LICA L12/E - Ken React Titanate Coupling Agent (neopentyl (diallyl) oxy, tri)dioctyl) phosphato titanate). 20% active coupling agent in EVA (Ethylene vinyl-acetate) carrier.

Table 2 illustrates core properties of the core blends of Table 1. In particular, an improved C.O.R. (coefficient of restitution) is observed compared to the control core by all titanate coupling agent blends. Blends EX-1–EX-3 illustrate increased C.O.R. (and slightly higher compression) when using 0.1–0.4 phr of a monoalkoxy titanate coupling agent. Blends EX-4–EX-5 illustrate increased C.O.R. (and slightly higher compression) when using 0.25–1.0 phr of a neoalkoxy titanate coupling agent.

Blends EX-4 and EX-5 were evaluated using an encapsulated coupling agent. The encapsulated coupling agent is 20% active titanate coupling agent. The level of neoalkoxy titanate coupling agent listed in Table 1 is the level of active coupling agent.

TABLE 2

Titanate Core Blends - Physical Properties

| Core Blend | Size | PGA Comp. | Weight | C.O.R. 125 ft/s | 150 ft/s |
|---|---|---|---|---|---|
| Cont | 1.5046" | 77 | 34.32 g | 0.781 | 0.754 |
| EX-1 | 1.5041" | 80.7 | 34.49 g | 0.788 | 0.757 |
| EX-2 | 1.5038" | 81.3 | 34.42 g | 9.788 | 0.757 |
| EX-3 | 1.5061" | 81 | 34.41 g | 0.787 | 0.758 |
| EX-4 | 1.5038" | 82.1 | 34.52 g | 0.789 | 0.759 |
| EX-5 | 1.5042" | 82.1 | 34.43 g | 0.787 | 0.757 |

FIG. 4 further illustrates the increased C.O.R. properties observed in all cores containing titanate coupling agents. This increase is consistent at inbound test velocities of 125 ft/s and 150 ft/s. A consistent increase of about 0.005 to 0.007 in C.O.R. is observed.

C.O.R. is measured by propelling the core against a hard surface at a specific inbound velocity and measuring the outbound velocity. The ratio of outbound and inbound velocities is the C.O.R.

While in the foregoing specification a detailed description of specific embodiments of the invention were set forth for the purpose of illustration, it will be understood that many of the details herein given can be varied considerably by those skilled in the art without departing from the spirit and scope of the invention.

I claim:

1. A golf ball core comprising:

100 parts by weight of rubber,
   about 10 to 50 phr of zinc diacrylate,
   about 0.2 to 5.0 phr of a crosslinking initiator, and
   about 0.1 to 2.0 phr of titanate coupling agent.

2. The core of claim 1 including a filler.

3. The core of claim 1 including an activator.

4. The core of claim 1 including an antioxidant.

5. The core of claim 1 in which the titanate coupling agent is selected from the class consisting of monoalkoxy titanates and neoalkoxy titanates.

6. The core of claim 1 in which the core has a coefficient of restitution at 125 feet/second of greater than 0.781.

7. The core of claim 1 in which the core has a coefficient of restitution at 125 feet/second of at least 0.787.

8. The core of claim 1 in which the crosslinking initiator is an organic peroxide.

9. The core of claim 8 in which the organic peroxide is dicumyl peroxide.

10. The core of claim 1 in which the rubber is polybutadiene having a cis-1,4 content of 97%.

11. A golf ball comprising a core and a cover, the core comprising:

100 parts of rubber,
    about 10 to 50 phr of zinc diacrylate,
    about 0.2 to 5.0 phr of a crosslinking initiator, and
    about 0.1 to 2.0 phr of titanate coupling agent.

12. The golf ball of claim 11 including a layer of elastic windings between the core and the core.

13. The golf ball of claim 11 in which the titanate coupling agent is selected from the class consisting of monoalkoxy titanates and neoalkoxy titanates.

14. The core of claim 11 in which the core has a coefficient of restitution at 125 feet/second of greater than 0.781.

15. The core of claim 11 in which the core has a coefficient of restitution at 125 feet/second of at least 0.787.

* * * * *